J. W. SWAN.
SYSTEM OF CARBURATION.
APPLICATION FILED SEPT. 18, 1918.
1,377,606.
Patented May 10, 1921.
3 SHEETS—SHEET 1.
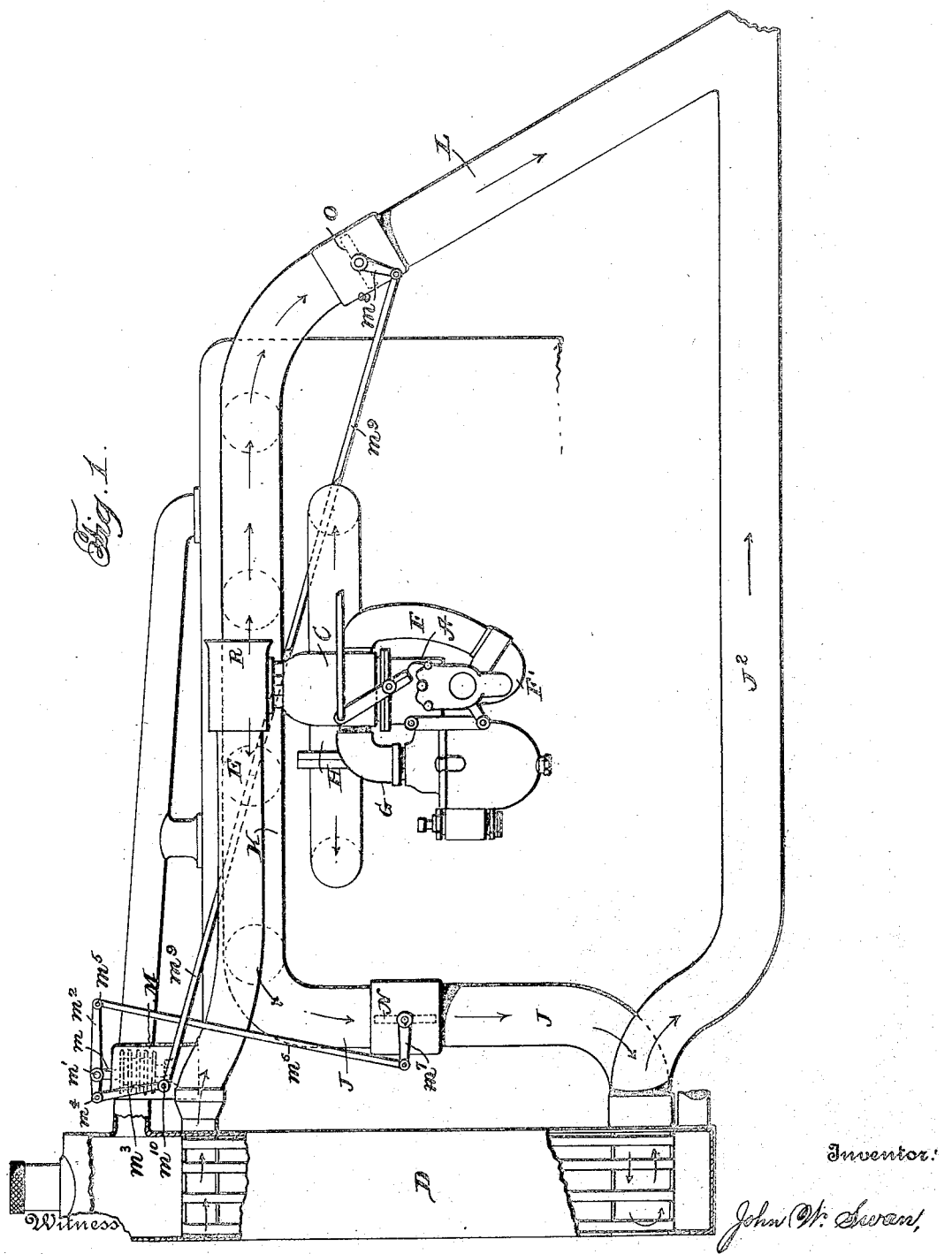

J. W. SWAN.
SYSTEM OF CARBURATION.
APPLICATION FILED SEPT. 18, 1918.
1,377,606.
Patented May 10, 1921.
3 SHEETS—SHEET 2.
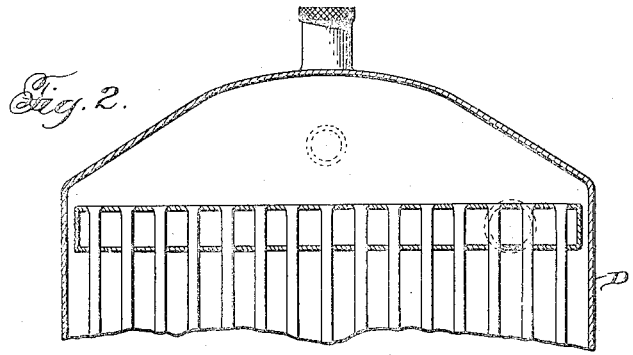
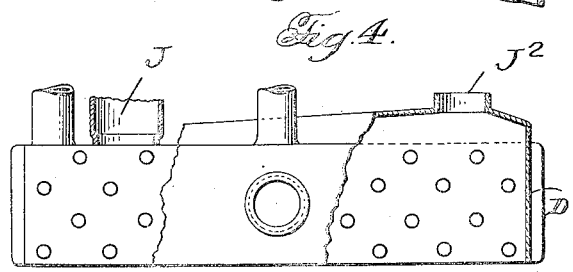
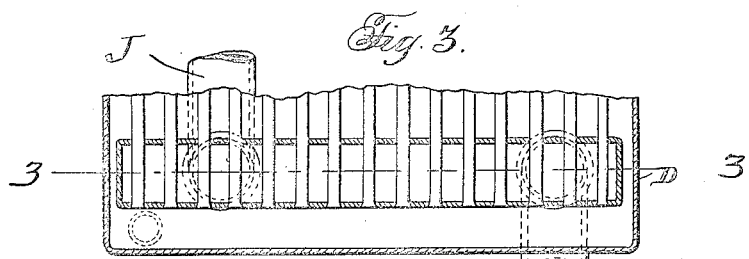
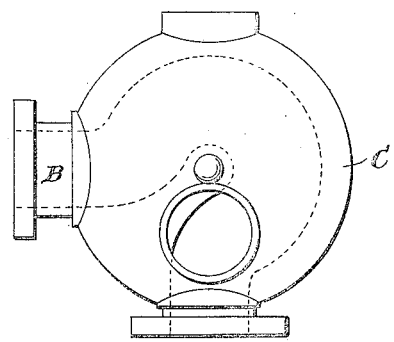
Witness:
Jas. Es. Hutchinson
Inventor:
John W. Swan,
By
Attorneys.

J. W. SWAN.
SYSTEM OF CARBURATION.
APPLICATION FILED SEPT. 18, 1918.
1,377,606.
Patented May 10, 1921.
3 SHEETS—SHEET 3.
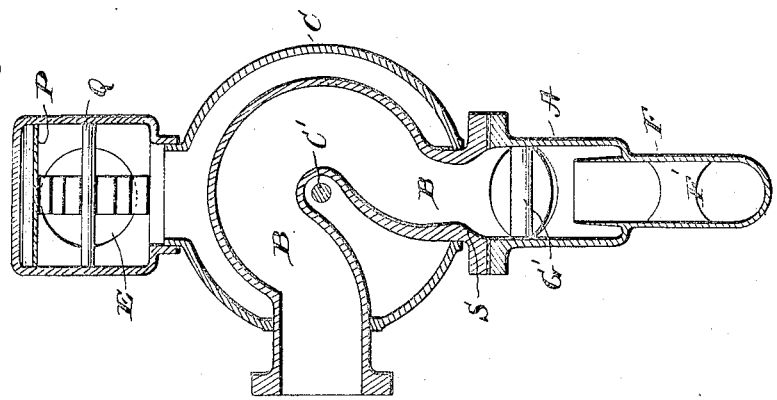
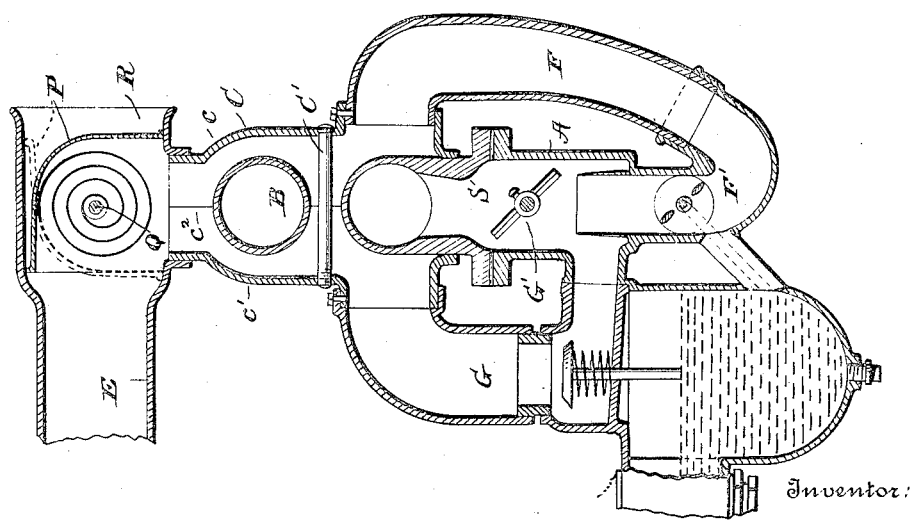

UNITED STATES PATENT OFFICE.

JOHN W. SWAN, OF STAMFORD, CONNECTICUT.

SYSTEM OF CARBURATION.

1,377,606.

Specification of Letters Patent.  Patented May 10, 1921.

Application filed September 18, 1918. Serial No. 254,599.

*To all whom it may concern:*

Be it known that I, JOHN W. SWAN, citizen of the United States, residing at Stamford, in the county of Fairfield and State of Connecticut, have invented certain new and useful Improvements in Systems of Carburation, of which the following is a specification, reference being had therein to the accompanying drawing.

This invention relates to an improved system of carburation intended especially for use in connection with gas engines, and has for its primary object the utilization of the waste heat of the exhaust gases to prevent excessive radiation and to aid vaporization of the fuel by supplying the waste heat of the exhaust gases to the intake manifold piping (and preferably also to the radiator) in such a manner as to promote static conditions of temperature and supply a uniformly sufficient degree of heat to the intake air and the walls of the intake manifold pipes, to aid vaporization of the fuel and prevent condensation of same in their passage through the manifold to the motor.

As gas made from gasolene through a carbureter is not a fixed gas, it will only remain as a gas so long as there is no reduction of its temperature, but a reduction of temperature immediately causes condensation which is then carried into the cylinders in the form of liquid and is lost as a heat value as heretofore explained.

On account of the refrigerating effect of the air and fuel entering the intake pipe or manifold, as set forth, the walls of the intake pipe become very cold, and therefore, the gas molecules coming in contact with these walls, largely due to their kinetic action, causes further condensation even to the point of causing the mixture to become so impoverished that ignition will not take place regularly. Thus, the motor will not accelerate when the throttle is opened, and often ceases to operate at all.

In overcoming the undesirable conditions above presented, and in assisting the carrying of the objects stated into practical effect, my invention resides in the provision of means for conducting heated air around the otherwise exposed portion of the intake manifold, and in using this manifold-heating air as heated air supplied to the carbureter in lieu of admitting to the carbureter cool external air. Thus a two-fold function is accomplished namely: the heated air will initially heat the manifold and thereby convert to gas the ultimate mixture leaving the carbureter; and said air in the continuance of its passage from the manifold to the carbureter tends to keep the carbureter also warm, but more especially discharges itself in a heated condition into the presence of the gas, thereby insuring better intermixing and vaporization of the gas and air.

It is a further object of the invention to provide an apparatus of this character in which the vapor manifold is constructed and arranged to present a maximum surface to the heating element in a minimum space to insure a proper temperature of the vapor and prevent chilling thereof during its passage to the engine cylinders.

The preferred embodiment of the invention comprises the provision of means for conducting air through the radiator to absorb heat from the latter, the heated air being then conducted around the manifold and finally discharged into the carbureter to mix with the incoming gasolene forming the gaseous vapor. It is desirable at times to regulate the temperature of the incoming air, and this is accomplished by regulating the temperature of the water in the engine radiator. To heat this water to the desired temperature, I propose to utilize a portion of the otherwise wasted heat of the exhaust gases to supply heat for raising the temperature of this water if necessary, and in carrying out the invention a thermostat is usually employed for controlling the entrance of the exhaust gases to the radiator.

The invention more specifically comprehends the provision of an automatically acting air valve for admitting a controlled quantity of air to mix with the heated air passing around the manifold to vary and regulate the temperature of this air which is ultimately introduced into the carbureter.

The improved details in construction and arrangement of parts constituting the foregoing embodiment of the invention will be more readily understood from the accompanying drawings wherein the same is shown, when considered in connection with the specific description hereinafter contained.

In the drawings:

Figure 1 is a side elevation, with parts broken away, and other parts in section showing the complete assembly of the stated embodiment of the invention;

Fig. 2 is a fragmentary front view of the upper portion of the radiator with the front of the radiator removed;

Fig. 3 is a similar view of the lower portion of the radiator;

Fig. 4 is a plan view with parts broken away;

Fig. 5 is an enlarged sectional view of the carbureter and immediately associated parts;

Fig. 6 is a vertical section taken at right-angles to Fig. 5; and,

Fig. 7 is a side elevation of the manifold-inclosing casing.

Referring more specifically to the drawings, A represents a carbureter, for example, one designed to secure a proper intermixing of gasolene and air.

B is the conducting pipe or neck portion of the manifold adapted to receive the air and gas mixture from the carbureter, as indicated by the arrows, and conduct said mixture through the manifold proper to the engine cylinders.

Completely surrounding the manifold portion B is a chamber C to which air passed through and heated by the radiator, as at D, is conducted through the medium of a flexible pipe E. The water in the radiator being customarily heated, will give off some of its heat to the air passing therethrough, and this heated air will in turn heat the manifold portion B during the passage of the air under the suction of the engine through surrounding chamber C. This chamber is formed by a two-part casing surrounding the portion B which has the curved formation shown, the halves of the casing being indicated at $c$, $c'$, and having meeting peripheral flanges $c^2$, securely held together, and in spaced relation to the member B (to form the chamber C) by a bolt or its equivalent $a'$. From the chamber C the heated air is sucked under the action of the engine, working through the carbureter A, through the passages F and G, the former feeding past the gas intake F' of the carbureter and the latter constituting an auxiliary air supply in proximity to the engine throttle G', in general respects following the arrangement illustrated in my Patent No. 1,260,594 dated March 26, 1918. Thus the air admitted to the carbureter for intermixing with the gas is of a warm or heated nature and is thereby helpful in securing a prompt and better intermixing and vaporization of the ultimate explosion mixture fed to the engine. The heating of the manifold portion B maintains the gaseous mixture in its heated condition until it passes through the manifold at H in immediate proximity to the intake portions of the engine cylinders and feeding thereinto in the usual manner. The piping leading from the carbureter to the manifold or the manifold pipe complete may be made of any suitable material or in any suitable form, the object being to supply sufficient heat to the manifold pipe walls and the intake air to completely vaporize the fuel content supplied to the motor under all conditions of speed and load.

It is highly desirable, particularly at certain seasons of the year, that the heat of radiator (or cooling means) be maintained at static temperature, and to allow for the use of some of such radiator heat in the heating of the air passing therethrough to the flexible pipe E and from thence on, as outlined, means are provided for heating the radiator, the same including a pipe J leading from the exhaust manifold K to the lower part of the radiator (see Fig. 3), and a pipe $J^2$ discharging from the opposite end of the radiator to the exterior of the car or into a muffler, or otherwise as desired or found expedient. L represents a pipe which might be termed the direct exhaust pipe connected to the rear end of the exhaust manifold K, as distinguished from what might be called the indirect exhaust constituted by the pipe J connected to the forward end of the exhaust manifold K and discharging, after passing through the radiator, into the pipe $J^2$, it being observed that the pipes L and $J^2$ merge into each other near their common final exit end.

To control the passage of the exhaust gases in compelling them to traverse either the course defined by the pipe J, radiator and pipe $J^2$, or that defined by the pipe L, suitable valves and controlling means (preferably automatic) are provided. The idea underlying the provision of automatically acting means being, as intimated, to enable the maintenance of the radiator water at a uniform temperature, and this may be attained by causing the direct or indirect exhaust to operate in consonance with the temperature of the radiator water, which temperature, acting through a temperature-responsive element will effect the actuation of the valves. Such a temperature-responsive element is represented at M, the same being introduced into the return water pipe of the radiator to be affected thereby. This device M is a thermostat of well known form, recognized in the art, and to be found on the market, it here sufficing to state that the same has an expansible fluted body carrying a stem part $m$ pivoted at a point $m'$ between the ends of one arm $m^2$ of a bell crank lever, the opposite arm of which is indicated at $m^3$, the lever as a whole being pivotally mounted in place at $m^4$. The free end of the arm $m^2$ is pivoted as at $m^5$ to a link $m^6$ in turn pivoted to the outer end of a crank or arm $m^7$ rigid with the shaft of a rotary valve N in the indirect exhaust pipe J. A similar valve O is placed in the direct exhaust pipe L and its operating arm or crank $m^8$ is united through the medium of a link $m^9$ pivoted thereto, with the free end of the other arm $m^3$ of the bell crank lever to which it is pivoted as at $m^{10}$.

The valves N and O are hung so that when one is closed, the other is open, and it will be readily understood that by the rocking of the bell crank lever and the corresponding shifting of the links $m^6$ and $m^9$, the valves will be turned to open one and close the other thereof simultaneously dependent on the course the exhaust gases are to be compelled to take to impart heat or keep heat from the radiator as determined by the temperature of the water exerting its influence on the thermostat M.

At times it may be desirable to furnish additional regulation for the temperature of the air passing around the manifold, and for this purpose, the upper portion of the chamber C, at the junction of the casing $c$—$c'$ with the pipe E is provided with a valve P, said valve being adapted to be operated in any suitable and desired manner, for example, automatically by placing a controlling thermostat in position to be influenced by the temperature of the confined air passing therearound. The valve P is in the nature of a curved plate, and the thermostat is a spiral, of customary different metals, connected at one end to the valve and at the other end to a fixed pin Q. Normally this valve occupies and is held in the position shown in Fig. 5 to complete the passage and direct the air from the pipe E to the chamber C.

However, when the heat becomes excessive, the thermostat is influenced and its movement about the pin Q, to which it is anchored, will throw the valve around, on said pin or shaft, to its opposite position (note dotted lines Fig. 5) closing the normal passage, and external cool air may be admitted into the chamber C from the then exposed open end R to reduce the temperature of the hot air around the manifold, and through such regulation to control, or automatically preserve at a constant or uniform temperature the said air.

At the base of the intake-manifold portion B, and intermediate of the manifold and throttle valve G', I preferably form and secure the advantages of a venturi S, which experience has demonstrated increases the velocity at the apex of the venturi, while not lessening the volume.

While as hereinbefore stated there is illustrated in this application the preferred embodiment of the invention, it will be clear to persons skilled in the art to which the invention relates that said invention is capable of embodiment in still other forms and devices as may be embraced within the spirit of the hereto appended claims.

I am aware that it has hitherto been attempted to supply heat to the carbureter and manifold piping of a gas engine in a variety of ways, but I believe I am the first in the art to heat the manifold pipe leading from the carbureter to the engine to overcome the tendency to condense the gaseous mixture passing therethrough by utilizing the air caused by the suction of the motor to first pass over some heated portion of the power plant or motor and then into a casing or chamber surrounding the manifold pipe which connects in turn with the intake air opening or openings of the carbureter, thus causing a continuous circulation through the chamber surrounding the manifold pipe, which air is maintained at a predetermined temperature either by automatic or manually operated means, preferably the former. It is intended that sufficient heat will be supplied to the circulating intake air to not only sufficiently heat the manifold pipe but also to uniformly heat the air thus supplied to the carbureter. Thus, the obtaining of a perfect explosive gas for the engine,—and this comprehends all of the cylinders thereof,—is insured.

What I claim is:—

1. The combination with the carbureter and intake manifold of an internal combustion engine, of means for conducting heated air into proximity with the manifold to heat the same and then delivering said heated air to the carbureter, and a radiator through which the air is admitted and by which the air is initially heated, and means for regulating the temperature of the radiator.

2. The combination with the carbureter and intake manifold of an internal combustion engine, of means for conducting heated air into proximity with the manifold to heat the same and then delivering said heated air to the carbureter, a radiator through which the air is admitted and by which the air is initially heated, and means for heating and controlling the temperature of the radiator.

3. The combination with a carbureter and intake manifold of an internal combustion engine, a radiator, a heater therefor, an air conductor arranged to have the air passing therethrough heated by the radiator, said conductor leading to a part of the carbureter-manifold structure, the heater for the radiator comprising the engine exhaust piping formed to run into and from the radiator, and means for automatically controlling the radiator heater.

4. The combination with a carbureter and intake manifold of an internal combustion engine, a radiator, a heater therefor, and an air conductor arranged to have the air passing therethrough heated by the radiator, said conductor leading to a part of the carbureter-manifold structure, the heater for the radiator comprising the engine exhaust piping formed to run into and from the radiator, and means for automatically controlling the radiator heater, said last mentioned means including valved means in the exhaust piping, and a heat-responsive controlling device associated with the radiator adapted to actuate the said valve to open or cut off communication of the exhaust piping with respect to the radiator.

5. The combination with a carbureter and intake manifold of an internal combustion engine, a radiator, a heater therefor, and an air conductor arranged to have the air passing therethrough heated by the radiator, said conductor leading to a part of the carbureter-manifold structure, the heater for the radiator comprising the engine exhaust piping formed to run into and from the radiator, and means for automatically controlling the radiator heater, said last mentioned means including valved means in the exhaust piping, and a heat-responsive controlling device associated with the radiator adapted to actuate the said valve to open or cut off communication of the exhaust piping with respect to the radiator, and other means constituting a direct exhaust from the engine, provided with a valve, also governed by said heat-responsive means to open and close contrary to the opening and closing of the first mentioned valve.

6. In combination with the carbureter and intake manifold of an internal combustion engine, a radiator, an air inlet pipe extending through the radiator and communicating with the carbureter, and means in the air inlet pipe, intermediate the radiator and carbureter, for automatically regulating the air supply to the carbureter.

7. In combination with the carbureter and intake manifold of an internal combustion engine, a radiator, an air inlet pipe extending through the radiator, surrounding a portion of the intake manifold, and communicating with the carbureter, and means in the air pipe, intermediate the intake manifold and carbureter for regulating the air supply.

8. In combination with the carbureter and intake manifold of an internal combustion engine, a radiator, an air inlet pipe leading through the radiator and open at each end, a branch leading from the air inlet pipe and communicating with the carbureter, and a valve within the air pipe whereby heated air may be directed to the carbureter from the radiator end of the pipe or cool air from the opposite end.

9. In combination with the carbureter and intake manifold of an internal combustion engine, a radiator, an air inlet pipe leading through the radiator and open at each end, a branch leading from the air pipe and communicating with the carbureter, and an automatically controlled valve within the air inlet pipe for admitting air to the carbureter from opposite ends of the air pipe.

10. In combination with the carbureter and intake manifold of an internal combustion engine, a radiator, an air inlet pipe communicating with the carbureter, said pipe having one end extending through the radiator whereby the air entering the pipe at that end will be heated and the opposite end spaced from the radiator for admitting cool air, and a valve intermediate the ends of the air inlet pipe whereby heated or cool air may be admitted to the carbureter from opposite ends of the pipe.

11. In combination with the carbureter and intake manifold of an internal combustion engine, a radiator, an air inlet pipe communicating with the carbureter, said pipe having one end extending through the radiator whereby the air entering the pipe at that end will be heated and the opposite end spaced from the radiator for admitting cool air, and an automatically controlled valve intermediate the ends of the air inlet pipe whereby heated or cool air may be admitted to the carbureter from opposite ends of the pipe, said valve being operated by the temperature of the incoming air.

12. In combination with the carbureter and intake manifold of an internal combustion engine, a radiator, an air inlet pipe surrounding a portion of the intake manifold and communicating with the carbureter, said air inlet pipe having one end extending through the radiator so that the air entering that end of the pipe will be heated and the opposite end spaced from the radiator for admitting cool air, and an automatically controlled valve intermediate the ends of the air inlet pipe, whereby heated or cool air may be admitted around the intake manifold and into the carbureter, said valve being operated by the temperature of the incoming air.

In testimony whereof I hereunto affix my signature in the presence of two witnesses.

JOHN W. SWAN.

Witnesses:
JOHN W. SCOFIELD,
CHARLES A. BERRY.